(12) United States Patent
Inoue et al.

(10) Patent No.: US 11,223,975 B2
(45) Date of Patent: Jan. 11, 2022

(54) COMMUNICATION APPARATUS, WIRELESS COMMUNICATION SYSTEM AND DATA FLOW CONTROL METHOD

(71) Applicant: NEC Corporation, Tokyo (JP)

(72) Inventors: Takamichi Inoue, Tokyo (JP); Kousuke Nogami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 16/646,195

(22) PCT Filed: Aug. 10, 2018

(86) PCT No.: PCT/JP2018/030099
§ 371 (c)(1),
(2) Date: Mar. 11, 2020

(87) PCT Pub. No.: WO2019/054112
PCT Pub. Date: Mar. 21, 2019

(65) Prior Publication Data
US 2020/0280883 A1 Sep. 3, 2020

(30) Foreign Application Priority Data

Sep. 12, 2017 (JP) .............................. JP2017-174911

(51) Int. Cl.
*H04W 28/10* (2009.01)
*H04W 28/02* (2009.01)

(52) U.S. Cl.
CPC ....... *H04W 28/10* (2013.01); *H04W 28/0252* (2013.01)

(58) Field of Classification Search
CPC ......... H04W 28/0252; H04W 28/0236; H04W 80/08; H04W 28/10; H04W 80/02;
(Continued)

(56) References Cited

U.S. PATENT DOCUMENTS 7,385,920 B2 * 6/2008 Zhang .................... H04L 47/70
370/229
7,525,991 B2 * 4/2009 Hirano .................... H04L 47/10
370/235
(Continued)

FOREIGN PATENT DOCUMENTS

JP 2003-319006 A 11/2003
JP 2009-081753 A 4/2009
(Continued)

OTHER PUBLICATIONS

International Search Report for PCT Application No. PCT/JP2018/030099, dated Sep. 11, 2018.
(Continued)

*Primary Examiner* — Man U Phan
(74) *Attorney, Agent, or Firm* — Sughrue Mion, PLLC

(57) ABSTRACT

A communication apparatus includes an accumulation means 501 that temporarily accumulates communication data in a previous stage of transmission to the MAC layer, an estimation means 502 that estimates an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by an own apparatus or a wireless device including a MAC layer used by the own apparatus, and a control means 503 that controls, on the basis of an estimation result of the amount of transmittable data, a data flow of when the communication data accumulated in the accumulation means 501 is transmitted to a lower layer.

8 Claims, 7 Drawing Sheets

(58) Field of Classification Search
CPC .... H04W 40/22; H04W 28/02; H04L 47/823; H04L 12/28; H04L 12/42; H04J 1/16; H04J 3/16; H04J 3/14
USPC .......................................................... 370/235
See application file for complete search history.

(56) References Cited

U.S. PATENT DOCUMENTS

| | | | | |
|---|---|---|---|---|
| 7,876,684 | B2* | 1/2011 | Ishii | H04L 47/10 370/235 |
| 8,406,199 | B2* | 3/2013 | Ishii | H04L 47/70 370/332 |
| 8,553,720 | B2* | 10/2013 | Bishara | G06F 5/065 370/469 |
| 8,861,597 | B2* | 10/2014 | Zhu | H04N 21/43615 375/240.1 |
| 9,210,107 | B2* | 12/2015 | Bishara | G06F 5/065 |
| 9,740,455 | B2* | 8/2017 | Bishara | H04L 47/10 |
| 9,967,769 | B2* | 5/2018 | Wigren | H04L 47/30 |
| 10,327,171 | B2* | 6/2019 | Wigren | H04L 47/30 |
| 2005/0180460 | A1 | 8/2005 | Hirano et al. | |
| 2006/0120321 | A1* | 6/2006 | Gerkis | H04W 28/22 370/329 |
| 2008/0069201 | A1 | 3/2008 | Zhu et al. | |

FOREIGN PATENT DOCUMENTS

| | | |
|---|---|---|
| JP | 2010-135909 A | 6/2010 |
| JP | 2013-078083 A | 4/2013 |

OTHER PUBLICATIONS

Zhang, B., Cross-layer Networking technology for wireless communications, IEICE Technical Report 2009, vol. 108, No. 448, chapter 3, pp. 29-34, Japan.

Japanese Office Communication for JP Application No. 2019-541956 dated Sep. 14, 2021 with English Translation.

* cited by examiner

COMMUNICATION APPARATUS, WIRELESS COMMUNICATION SYSTEM AND DATA FLOW CONTROL METHOD

This application is a National Stage Entry of PCT/JP2018/030099 filed on Aug. 10, 2018, which claims priority from Japanese Patent Application 2017-174911 filed on Sep. 12, 2017, the contents of all of which are incorporated herein by reference, in their entirety.

TECHNICAL FIELD

The present invention relates to a communication apparatus, a wireless communication system, and a data flow control method.

BACKGROUND ART

Recently, by connection of things to the Internet (Internet of Things (IOT)), new data that has not existed before and a new value using the data are transmitted, and a social change is about to occur. With the spread of IoT, it is expected that utilization of wireless communication such as data collection from industrial equipment or remote control of industrial equipment is increased in a place or environment where wireless communication is not used before (such as factory or construction site).

Wireless communication includes what uses a licensed band that requires a radio station license, and what uses an unlicensed band that requires no radio station license. In wireless communication used in a closed space such as a factory, it is considered that an unlicensed band is often used in consideration of a connection cost.

However, since wireless communication using an unlicensed band has no restriction in a wireless device to be used, radio quality is rapidly deteriorated by radio wave interference or noise from a different device.

With respect to a problem such as buffer overflow in a communication flow due to such rapid deterioration in radio quality, Patent Literature 1 discloses a flow control method of avoiding overflow of a reception buffer in a transmission destination on the assumption of a wireless local area network (LAN) using an unlicensed band. In Patent Literature 1, for each transmission destination, a reception buffer size of the transmission destination is previously acquired, and flow control is performed, by utilization of a transmission data size of a transmission source and a transmission confirmation status thereof, in such a manner that a reception buffer of the transmission destination does not overflow. Accordingly, since a data loss in the reception buffer in the transmission destination can be controlled, a communication characteristic is improved.

CITATION LIST

Patent Literature

PTL 1: Japanese Patent Application Laid-Open No. 2010-135909

SUMMARY OF INVENTION

Technical Problem

However, although the method described in Patent Literature 1 can solve overflow in a reception buffer in a transmission destination, a method of solving overflow generated in a transmission buffer in a transmission source is not disclosed.

In a case where radio quality is rapidly deteriorated in wireless communication using an unlicensed band, an amount of data that can be transmitted wirelessly is decreased rapidly. Here, when an upper-layer protocol cannot follow this rapid change and transmits a large amount of data to a wireless transmission unit, overflow is generated not only in a reception buffer in a transmission destination but also in a transmission buffer in a transmission source, and a communication characteristic is significantly deteriorated. Also, not only in a case where the radio quality is rapidly deteriorated but also in a case where the number of connected devices is rapidly increased, it is considered that a similar problem is generated when the upper-layer protocol cannot follow this change.

Specifically, in a wireless LAN system, a band in which transmission is possible (hereinafter, referred to as available band) in a media access control (MAC) layer is rapidly decreased due to a rapid deterioration in radio quality or a rapid increase in the number of connected devices. As a result, retransmission in the MAC layer is performed frequently and a probability of using the available band for the retransmission is rapidly increased. Thus, transmission efficiency in wireless transmission is greatly decreased, and data transmitted from an IoT device to the wireless transmission unit cannot be handled in wireless transmission, and overflow is generated in the transmission buffer in the transmission source.

In view of the above-described problems, the present invention is to provide a communication apparatus, a wireless communication system, and a data flow control method that can improve a communication characteristic even in a case where a rapid environmental change such as a rapid deterioration in radio quality or a rapid increase in the number of connected devices is generated in a wireless communication system using an unlicensed band.

Solution to Problem

A communication apparatus according to the present invention is a communication apparatus that is used in a wireless communication system in which a plurality of wireless devices shares a frequency used for communication and that performs, by operating as an upper layer of a MAC layer included in any of the wireless devices, wireless communication with a different wireless device through the MAC layer, the communication apparatus including: an accumulation means that temporarily accumulates communication data in a previous stage of transmission to the MAC layer; an estimation means that estimates an amount of transmittable data, which is an amount of data that can be transmitted in the MAC layer in a predetermined period, by using a radio wave index that is an index related to a radio wave in a frequency measured by an own apparatus or a wireless device including the MAC layer used by the own apparatus and/or a communication index that is an index related to wireless communication using the frequency; and a control means that controls, on the basis of an estimation result of the amount of transmittable data, a data flow of when the communication data is transmitted to a lower layer.

Also, a wireless communication system according to the present invention includes a plurality of wireless devices that shares a frequency used for wireless communication, and a communication control apparatus that performs, by operating as an upper layer of a MAC layer included in any of the wireless devices, wireless communication with a different wireless device through the MAC layer, the communication control apparatus including an accumulation means that temporarily accumulates communication data in a previous stage of transmission to the MAC layer, an estimation means that estimates an amount of transmittable data, which is an amount of data that can be transmitted in the MAC layer in a predetermined period, by using a radio wave index that is an index related to a radio wave in a frequency measured by an own apparatus or a wireless device including the MAC layer used by the own apparatus and a communication index that is an index related to wireless communication using the frequency, and a control means that controls, on the basis of an estimation result of the amount of transmittable data, a data flow of when the communication data is transmitted to a lower layer.

Also, a data flow control method according to the present invention being performed by a communication apparatus that is used in a wireless communication system in which a plurality of wireless devices shares a frequency used for communication and that performs, by operating as an upper layer of a MAC layer included in any of the wireless devices, wireless communication with a different wireless device through the MAC layer, the method including: temporarily accumulating communication data in a previous stage of transmission to the MAC layer; estimating an amount of transmittable data, which is an amount of data that can be transmitted in the MAC layer in a predetermined period, by using a radio wave index that is an index related to a radio wave in a frequency measured by an own apparatus or a wireless device including the MAC layer used by the own apparatus and/or a communication index that is an index related to wireless communication using the frequency; and controlling, on the basis of an estimation result of the amount of transmittable data, a data flow of when the communication data is transmitted to a lower layer.

Advantageous Effects of Invention

According to the present invention, it is possible to effectively use an available band at maximum and to improve a communication characteristic even in a case where a rapid environmental change such as a rapid deterioration in radio quality or a rapid increase in the number of connected devices is generated in a wireless communication system using an unlicensed band.

DESCRIPTION OF EMBODIMENTS

Figure 1:
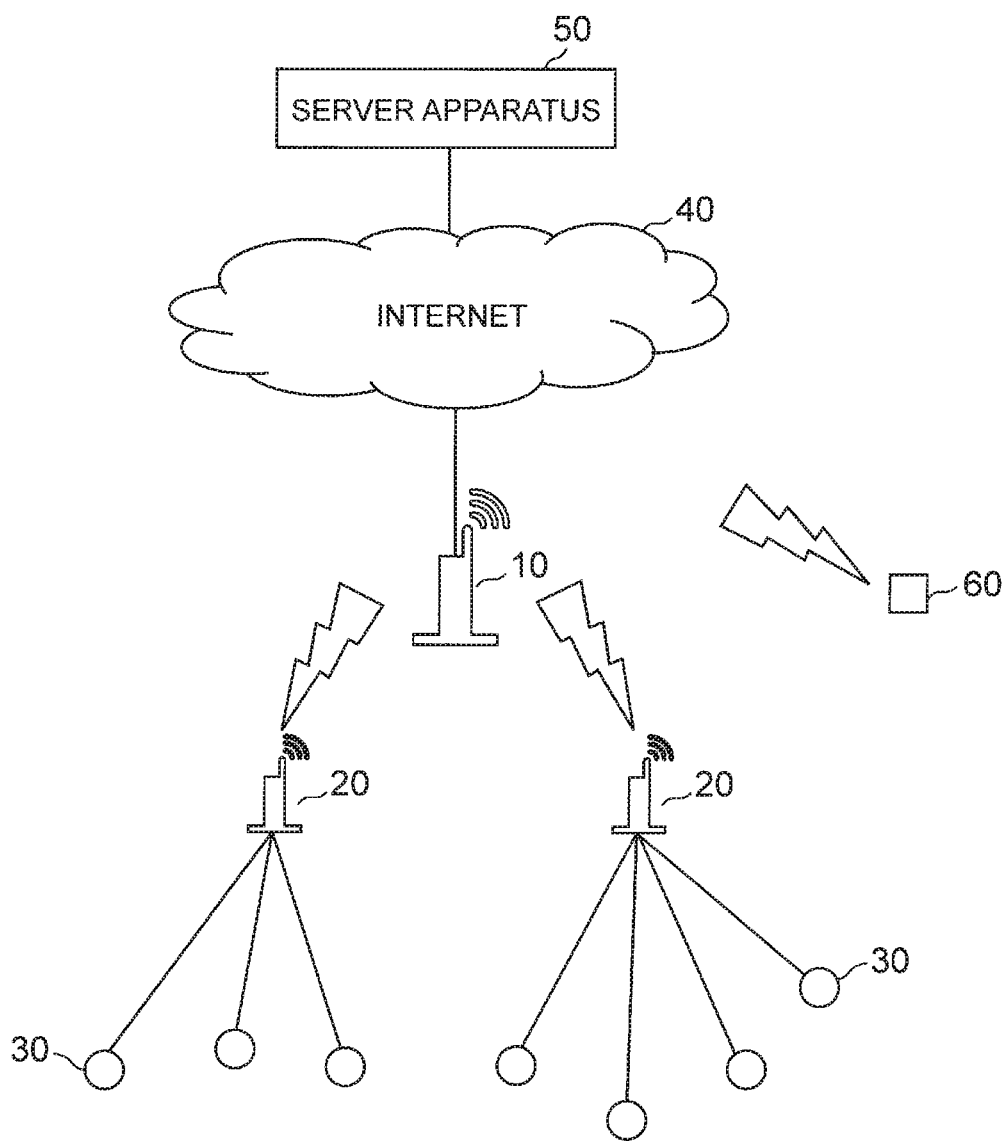
FIG. 1 It depicts a configuration diagram illustrating an example of a network configuration of a wireless communication system of a first exemplary embodiment.

In the following, exemplary embodiments of the present invention will be described with reference to the drawings. Note that in the drawings, the same number is assigned to the same or corresponding elements, and an overlapped description thereof is omitted.

First Exemplary Embodiment

FIG. 1 is a configuration diagram illustrating an example of a network configuration of a wireless communication system of the exemplary embodiment. As illustrated in FIG. 1, a wireless communication system of the present exemplary embodiment includes a server apparatus 50, a relay apparatus 10, a relay apparatus 20, and an IoT device 30.

In the wireless communication system of the present exemplary embodiment, there are a master device (relay apparatus 10) and a slave device (relay apparatus 20) of relay apparatuses in a wireless network, and the IoT device 30 can transmit/receive a signal to/from the relay apparatus 10 (master device) through the relay apparatus 20 (slave device).

Also, the IoT device 30 and the relay apparatus 20 may be connected wirelessly although being connected by wire in the example illustrated in FIG. 1. Also, the relay apparatus 10 is connected to the server apparatus 50 through the Internet 40.

In the present exemplary embodiment, the relay apparatus 20 estimates an available band of a MAC layer in the own apparatus by using a predetermined radio wave index and communication index measured in the own apparatus. By using the estimated result, an upper layer of the MAC layer controls a flow rate of a data flow of user data transmitted to the MAC layer (more specifically, data packet received from IoT device 30 and transmitted to wireless communication network). The control of the flow rate of the data flow of the user data may be performed at arbitrary timing before the user data is passed to the MAC layer. As an example, there is a configuration in which an application layer temporarily accumulates user data and controls a flow rate of data passed to a transport layer. In such a manner, the control of a flow rate of a data flow of user data in the present invention includes controlling a flow rate of a data flow of user data, which is passed to a MAC layer directly or indirectly, by controlling a flow rate of a data flow of wireless communication data transmitted from an upper layer of the MAC layer to a lower layer. Note that an upper layer that controls a flow rate of a data flow is not limited to the application layer, and is not specifically limited as long as being a layer, such as a transport layer, which is an upper layer of the MAC layer.

More specifically, the relay apparatus 20 that collects data from each of subordinate IoT devices 30 estimates a band in which transmission can be performed (available band) in the MAC layer by the Bayesian estimation using statistical information of a radio wave index and a communication index measured in transfer (reception and transmission) of the collected data. Then, data flow control is performed according to the estimated available band, and wireless transmission to the relay apparatus 10 is performed. Note that it is assumed that a wireless LAN that is a communication standard using an unlicensed band is used for wireless communication between the relay apparatus 20 and the relay apparatus 10.

Note that the Internet 40 may be a local or private network that is not connected to an external network device.

Also, it is assumed that the wireless communication system of the present exemplary embodiment is in an environment in which there are wireless devices 60 that may use the same frequency channel in the wireless communication network and in which there is a possibility of interfere with wireless LAN communication between the relay apparatus 20 and the relay apparatus 10.

Figure 2:
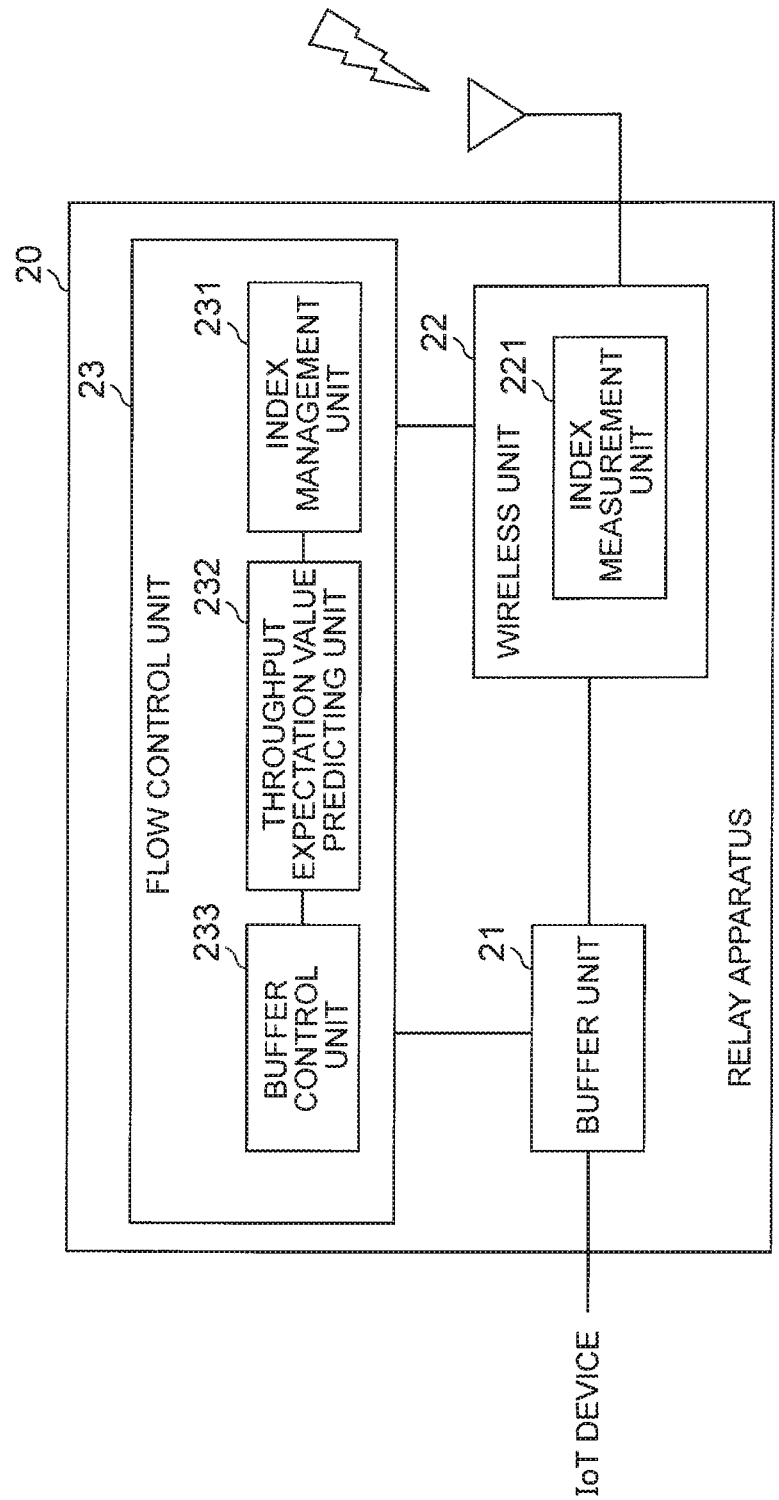
FIG. 2 It depicts a functional block diagram illustrating a configuration example of a relay apparatus of the first exemplary embodiment.

FIG. 2 is a functional block diagram illustrating a configuration example of the relay apparatus 20 (slave device) as a communication apparatus that performs flow control of the present invention in the present exemplary embodiment. The relay apparatus 20 illustrated in FIG. 2 includes a buffer unit 21, a wireless unit 22, and a flow control unit 23.

The buffer unit 21 temporarily accumulates wireless communication data that is user data transmitted to the wireless communication network (data packet received from IoT device 30, in this example). Also, the buffer unit 21 notifies the flow control unit 23 of information related to the temporarily accumulated data.

Here, the information related to the data is, for example, five tuples (source address, destination address, source port, destination port, and protocol number) that are in an IP header of a data flow of each piece of data or/and priority of each data flow, a data requirement, and the like. Notification of the priority or the data requirement may be in-band signaling to give a notification by using a specific field in a data packet transmitted from the IoT device 30, or may be out-band signaling to give a notification separately from the data.

The wireless unit 22 includes an index measurement unit 221. The index measurement unit 221 measures a radio wave index that is an index related to a radio wave and a communication index that is an index related to wireless communication which indices can be measured by the own apparatus. These measured indices are input into the flow control unit 23.

Examples of the radio wave index include a received signal strength indicator (RSSI), received signal power of a case where a wireless device in a transmission destination does not transmit a beacon frame (hereinafter, referred to as background noise power), a signal to noise ratio (SNR), a signal to noise-plus-interference ratio (SINR), and the like. Also, examples of the communication index include a bit error rate, a packet (frame) error rate, a transmission delay, a throughput in a physical layer, a throughput in a MAC layer, the average number of times of retransmission, the number of connected devices, an amount of data accumulated in a transmission buffer of the wireless unit 22 (amount of transmission waiting data), a remaining capacity of the transmission buffer, a use probability (hereinafter, also referred to as "use frequency") of a modulation and coding scheme (MCS), and the like. Note that the MCS is acquired by conversion of a combination of a modulation method and a coding rate into an index. The radio wave index and the communication index are preferably indices with which a change in a wireless communication environment leading to a transmission buffer overflow (such as deterioration in radio quality, change in number of connected device, or change in amount of transmission data) can be specifically detected.

The flow control unit 23 includes an index management unit 231, a throughput expectation value predicting unit 232, and a buffer control unit 233. With measurement results of the radio wave index and the communication index from the index measurement unit 221 being an input, the index management unit 231 generates statistical information of the radio wave index and the communication index. The index management unit 231 statistically processes the information input from the index measurement unit 221 and inputs the processed information (statistical information of radio wave index and/or statistical information of communication index) into the throughput expectation value predicting unit 232.

The throughput expectation value predicting unit 232 predicts a throughput expectation value by using the statistical information of the radio wave index and the communication index input from the index management unit 231. Here, an expectation value of the throughput is identical to an available band of the MAC layer in an ideal prediction.

The buffer control unit 233 determines a data flow transmitted from the buffer unit 21 and a data amount thereof on the basis of the throughput expectation value predicted in the throughput expectation value predicting unit 232 and information related to the temporarily accumulated data, and transmits the data accumulated in the buffer unit 21 to the wireless unit 22 according to the determined contents. Note that the buffer control unit 233 can input flow control information indicating the determined contents (data flow transmitted from buffer unit 21 and data amount thereof) into the buffer unit 21, and the buffer unit 21 can transmit primarily-accumulated data to the wireless unit 22 on the basis of the flow control information from the flow control unit 23 (buffer control unit 233).

The wireless unit 22 receives the data transmitted from the buffer unit 21, generates a transmission frame according to a protocol of the wireless LAN, and performs wireless transmission.

In such a manner, in the relay apparatus 20, an available band of the MAC layer is estimated by utilization of the radio wave index and the communication index, and a flow rate of a data flow of wireless communication data is controlled in an upper layer of the MAC layer by utilization of a result of the estimation. Note that in the present exemplary embodiment, the wireless unit 22 corresponds to the MAC layer, and the flow control unit 23 corresponds to an upper layer (such as application layer).

Figure 3:
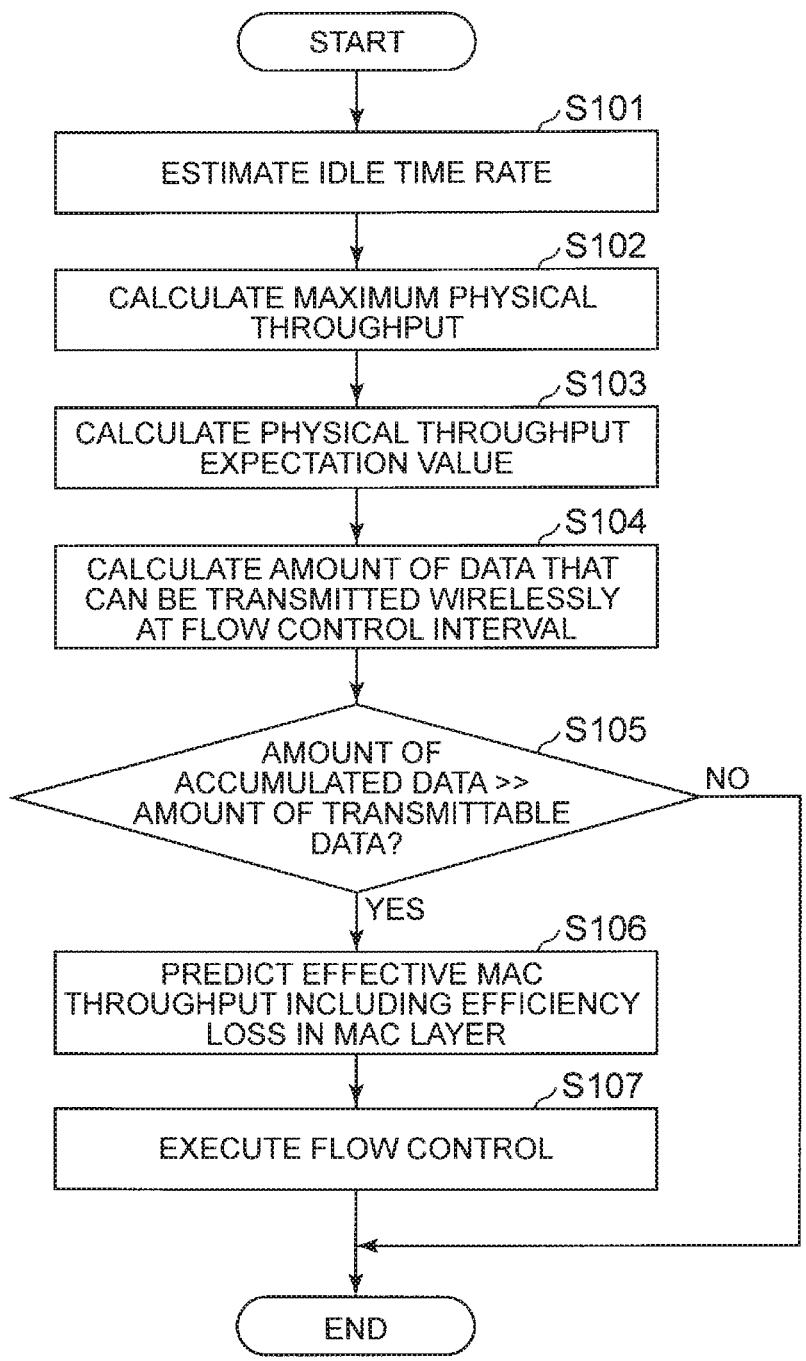
FIG. 3 It depicts a flowchart illustrating an operation example of the relay apparatus of the first exemplary embodiment.

Next, an operation of the relay apparatus 20 of the present exemplary embodiment will be described. FIG. 3 is a flowchart illustrating an example of the operation of the relay apparatus 20 of the present exemplary embodiment, specifically, an operation related to a method of predicting a throughput expectation value and flow control based on the available band of the MAC layer in the flow control unit 23.

In the example illustrated in FIG. 3, first, by using statistical information of a radio wave index, the throughput expectation value predicting unit 232 of the relay apparatus 20 estimates an idle time rate that is a probability that a wireless device does not perform wireless transmission in unit time in a wireless communication network of an object of the flow control (Step S101).

A method of estimating an idle time rate will be described with reference to FIG. 4. In the present example, it is assumed that the index measurement unit 221 measures an RSSI at certain intervals, and the index management unit 231 stores time-series data of the measured value.

Figure 4:
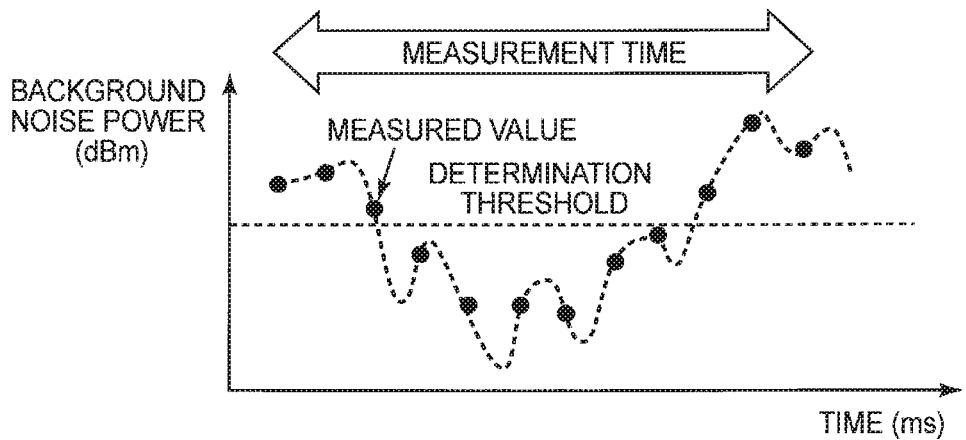
FIG. 4 It depicts a view for describing a method of estimating an idle time rate in the first exemplary embodiment.

In such a case, the throughput expectation value predicting unit 232 estimates, as an idle time rate, a probability that a measured value of background noise power in a measurement interval is equal to or smaller than a previously-set determination threshold of the background noise power, as illustrated in FIG. 4. Note that the determination threshold of the background noise power may be set and changed according to surrounding wireless environment. Also, here, an example using the background noise power has been described. However, a different radio wave index such as an RSSI, an SNR, or an SINR may be used.

Also, the throughput expectation value predicting unit 232 calculates the maximum physical throughput by using the measured RSSI (Step S102). In a case of a wireless LAN, a method of selecting an MCS according to radio quality is employed in each wireless standard (such as IEEE802.11a or IEEE802.11n). When the index measurement unit 221 inputs the used MCS into the index management unit 231, a use probability of each MCS in the measurement interval is understood in the index management unit 231. The index management unit 231 inputs the acquired use probability of each MCS into the throughput expectation value predicting unit 232. The throughput expectation value predicting unit 232 calculates an expectation value of the maximum physical throughput from the input use probability of each MCS, and sets the expectation value as a maximum physical throughput. Here, although a description for utilization of the RSSI has been made, a different radio wave index such as an SNR or an SINR may be used.

Next, the throughput expectation value predicting unit 232 calculates an expectation value of a physical throughput by using the estimated idle time rate and the maximum physical throughput (Step S103). For example, the expectation value of the physical throughput is calculated by multiplication of the idle time rate by the maximum physical throughput.

Next, the buffer control unit 233 calculates an amount of data that can be transmitted at a control interval of the flow control unit 23 (hereinafter, simply referred to as amount of transmittable data) on the basis of the expectation value of the physical throughput, which value is predicted by the throughput expectation value predicting unit 232, and the information related to the temporarily accumulated data (Step S104). For example, when the control interval of the flow control is 100 ms (0.1 s), in a case where the expectation value of the physical throughput which value is calculated above is 30 Mbps, the amount of transmittable data is 30 Mbps×0.1 s/8 bits=375 KB.

Then, the throughput expectation value predicting unit 232 compares the amount of data temporarily accumulated in the buffer unit 21 with the amount of transmittable data (Step S105). When the amount of temporarily accumulated data is smaller than the amount of transmittable data, there is no need to control transmission of data by the flow control. Thus, the subsequent calculation of an effective MAC throughput and flow control are skipped and the processing is ended (Step S105 No).

On the other hand, when the amount of temporarily accumulated data is larger than the amount of transmittable data, it is necessary to control transmission of the data by the flow control. Thus, the processing advances to processing of calculating an effective MAC throughput used in the flow control (Step S106) (Step S105 Yes). Note that since the amount of transmittable data which amount is calculated on the basis of the physical throughput does not include an efficiency loss in the MAC layer, a correction term assuming the efficiency loss in the MAC layer may be introduced in comparison, or determination may be made on the basis of a result of prediction of an effective MAC throughput in the MAC layer described later.

In Step S106, the throughput expectation value predicting unit 232 predicts the effective MAC throughput including the efficiency loss in the MAC layer by using Bayesian estimation (Step S106).

In the following, a method of predicting the effective MAC throughput by using the Bayesian estimation will be described.

The following equation (1) is an equation widely known as a Bayesian theorem.

[Math 1]

$$P(Y|K) = \frac{P(X|Y)P(Y)}{\sum_Y P(X|Y)P(Y)} \quad (1)$$

P(Y|X) is a conditional probability that an event Y occurs after an event X occurs (also called posterior probability). P(X|Y) is a conditional probability that the event X occurs when the event Y occurs (also called likelihood). P(Y) is a probability of occurrence of the event Y (also called prior probability).

Here, it is defined that an event $X_a$ indicates that an expectation value of a physical throughput is a, and an event $Y_b$ indicates that a measured value of an effective MAC throughput is b. The index measurement unit 221 measures the effective MAC throughput at certain intervals, and performs an input thereof into the index management unit 231. By using the input effective MAC throughput, the index management unit 231 calculates a probability $P(Y_b)$ that the measured value of the effective MAC throughput is b, and keeps performing an update according to the input. Similarly, in a case where the measured value of the effective MAC throughput is b, a conditional probability $P(X_a|Y_b)$ that the expectation value of the physical throughput is a is also calculated, and is kept updated according to the input.

In Step S106, when the expectation value of the physical throughput which value is estimated in Step S104 is a, the throughput expectation value predicting unit 232 first calculates a conditional probability $P(Y_b|X_a)$ that the measured value of the effective MAC throughput is b of a case where the expectation value of the physical throughput is a by substituting $P(Y_b)$ and $P(X_a|Y_b)$ calculated by the index management unit 231 into the equation (1). Here, since a value to be predicted is an expectation value of the effective MAC throughput of a case where the expectation value of the physical throughput is a, the expectation value of the effective MAC throughput is predicted by the following equation (2).

[Math 2]

$$\Sigma_Y b P(Y_b|X_a) \quad (2)$$

Finally, the buffer control unit 233 performs flow control by using the expectation value of the effective MAC throughput acquired in Step S106 (Step S107). As an example of a method of determining the amount of data transmitted to the wireless unit 22 in the flow control, there is a method of transmitting data from the buffer unit 21 by the same throughput as the expectation value of the effective MAC throughput.

Also, in order to prevent data exhaustion in the buffer of the wireless unit 22, the buffer control unit 233 may add a predetermined margin to the expectation value of the effective MAC throughput and transmit data from the buffer unit 21 to the wireless unit 22. Also, in order to prevent data overflow in the buffer of the wireless unit 22, the buffer control unit 233 may reduce a predetermined margin from the expectation value of the effective MAC throughput and transmit data from the buffer unit 21 to the wireless unit 22.

Also, in a case where a plurality of data flows having different priorities are accumulated, the throughput expectation value predicting unit 232 and the buffer control unit 233 perform a method of determining a transmission amount by the flow control from a data flow with high priority and increasing an amount of transmitted data until the expectation value of the effective MAC throughput is reached.

In such a manner, since being a method of controlling an amount of data transmitted to the wireless unit 22, the data flow control method according to the present exemplary embodiment can be performed without changing a function related to wireless data communication, specifically, scheduling of the MAC layer or a communication access method in the physical layer.

Note that a configuration in which a throughput estimation function or a flow control function is realized by the relay apparatus 20 has been described in the present exemplary embodiment. However, the functions may be realized in a different device instead of the relay apparatus 20.

Also, as a method of estimating the effective MAC throughput of the present exemplary embodiment, an example in which only one variable called a physical throughput is an input has been described. However, Bayesian estimation may be performed with a different communication index (such as packet error rate or delay).

Also, as a method of estimating an effective MAC throughput of the present exemplary embodiment, an example in which an effective MAC throughput is estimated after a physical throughput is calculated has been described. However, the Bayesian estimation of an effective MAC throughput may be performed directly from a relationship between a measured radio wave index and communication index, and the effective MAC throughput without calculation of a physical throughput.

As described above, according to the present exemplary embodiment, an available band in the MAC layer is estimated by utilization of a radio wave index and/or a communication index before data transmission. Also, on the basis of the estimated available band, an upper layer of the MAC layer controls a flow rate of a data flow of wireless communication data transmitted to a lower layer and performs data transmission, whereby the available band can be effectively utilized at maximum. Thus, it is possible to control buffer overflow in a transmission source and to improve a communication characteristic in a wireless communication system using an unlicensed band.

Second Exemplary Embodiment

In the first exemplary embodiment, a configuration in which a throughput estimation function or a flow control function are realized by the relay apparatus 20 has been described. However, in the second exemplary embodiment, a configuration in which these functions are realized by a communication control apparatus independent from a relay apparatus 20 is exemplified. Also, a method of estimating an effective MAC throughput by using Bayesian estimation has been described in the first exemplary embodiment. However, in the second exemplary embodiment, a method of performing estimation by using a model equation of an effective MAC throughput based on a communication index is exemplified.

Figure 5:
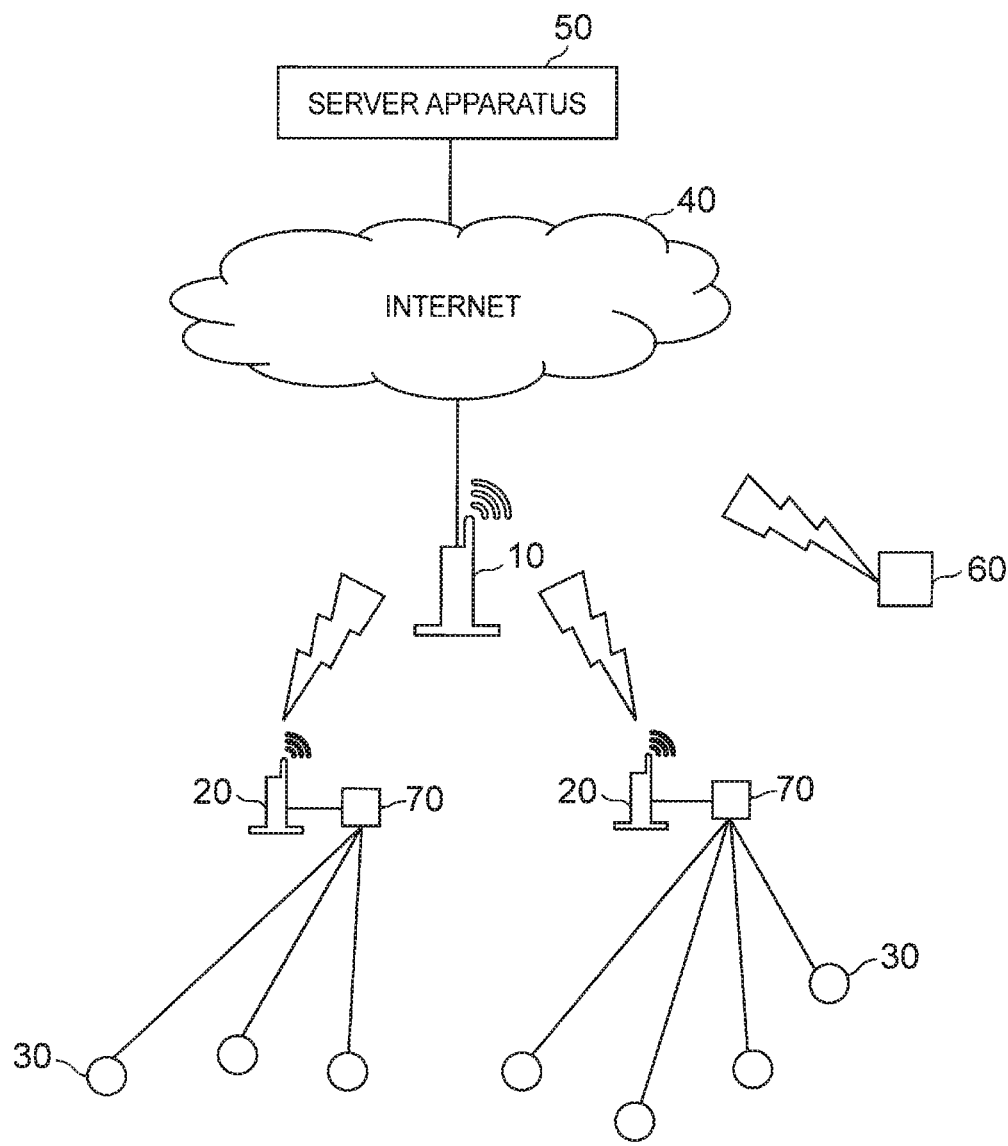
FIG. 5 It depicts a configuration diagram illustrating an example of a network configuration of a wireless communication system of a second exemplary embodiment.

FIG. 5 is a configuration diagram illustrating an example of a network configuration of a wireless communication system of the present exemplary embodiment. As illustrated in FIG. 5, in the present exemplary embodiment, a communication control apparatus 70 is further included between a relay apparatus 20 (slave device) and an IoT device 30.

In a wireless network of a wireless communication system of the present exemplary embodiment, a communication control apparatus 70 connected to a relay apparatus 20 exists in addition to a relay apparatus 10 and the relay apparatus 20. The IoT device 30 can transmit/receive a signal to/from the relay apparatus 10 through the communication control apparatus 70 and the relay apparatus 20.

Note that in the present exemplary embodiment, it is also assumed that a wireless LAN, which is a communication standard using an unlicensed band, is used for wireless communication between the relay apparatus 20 (slave device) and the relay apparatus 10 (master device) similarly to the first exemplary embodiment.

Also, in FIG. 5, the IoT device 30 and the communication control apparatus 70 are connected by wire, but may be connected wirelessly. The other points are similar to those of the first exemplary embodiment.

Figure 6:
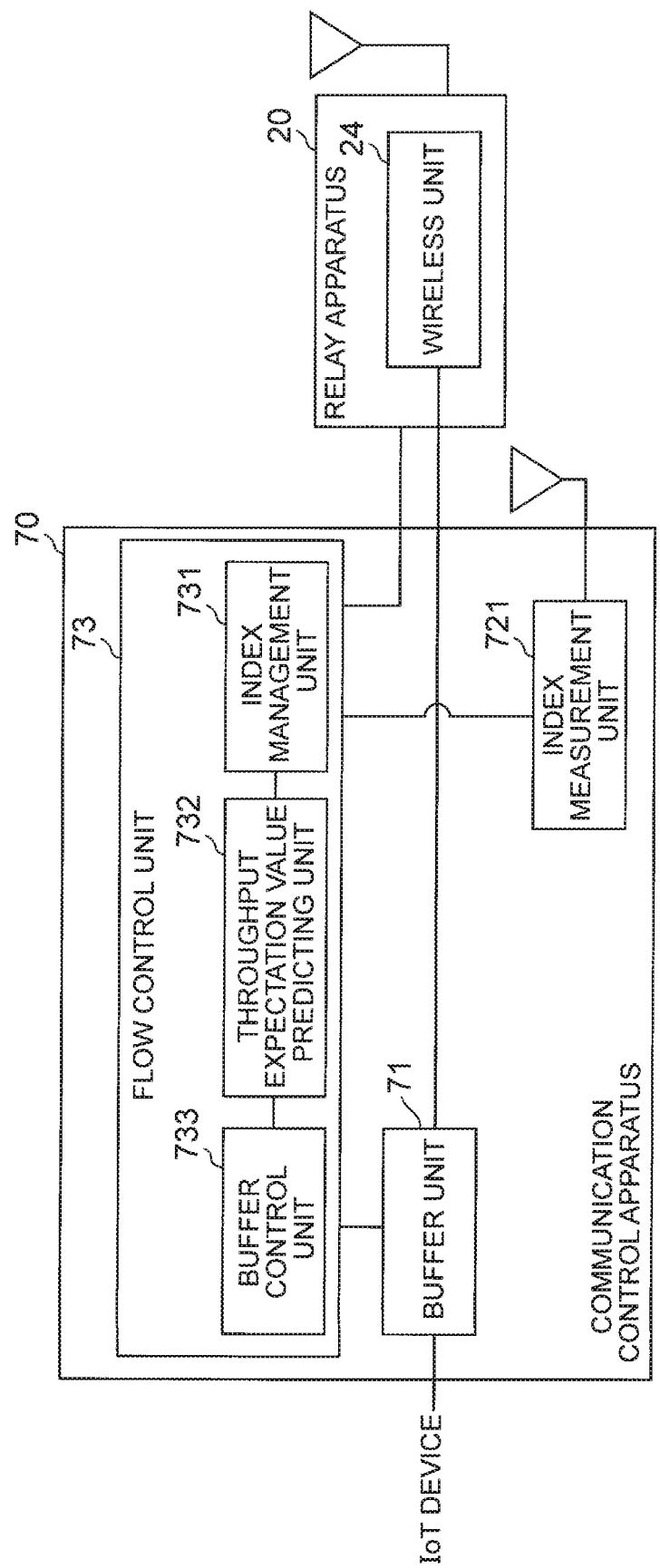
FIG. 6 It depicts a functional block diagram illustrating a configuration example of a communication control apparatus and a relay apparatus of the second exemplary embodiment.

FIG. 6 is a functional block diagram illustrating a configuration example of the communication control apparatus 70 as a communication apparatus that performs flow control of the present invention in the present exemplary embodiment.

As illustrated in FIG. 6, the communication control apparatus 70 has functions equivalent to the functions held by the relay apparatus 20 in the first exemplary embodiment. That is, the communication control apparatus 70 includes a buffer unit 71, an index measurement unit 721, and a flow control unit 73. Also, the flow control unit 73 includes an index management unit 731, a throughput expectation value predicting unit 732, and a buffer control unit 733. Note that the relay apparatus 20 includes a wireless unit 24 that is a wireless communication function excluding an index measurement unit 221.

Since each function is similar what has been described in the first exemplary embodiment, a description thereof is omitted.

Note that the index measurement unit 221 existing in the wireless unit 22 of the relay apparatus 20 in the first exemplary embodiment is provided as an index measurement unit 721 independent from a wireless unit in the communication control apparatus 70 in the present exemplary embodiment. The index measurement unit 721 measures an index that is related to a radio wave in a wireless communication network (radio wave index) and that can be measured by the own apparatus by utilization of an antenna or the like included in the communication control apparatus 70. Note that a log of the communication index input from the relay apparatus 20 is used as a communication index.

The relay apparatus 20 in the present exemplary embodiment only has a radio function of an access point of a basic wireless LAN, and inputs a log of an already-supported communication index into the communication control apparatus 70. In performance of the present invention, it is assumed that no special function is added to the relay apparatus 20 and the relay apparatus 20 is a configuration not considering an existence of the communication control apparatus 70.

Figure 7:
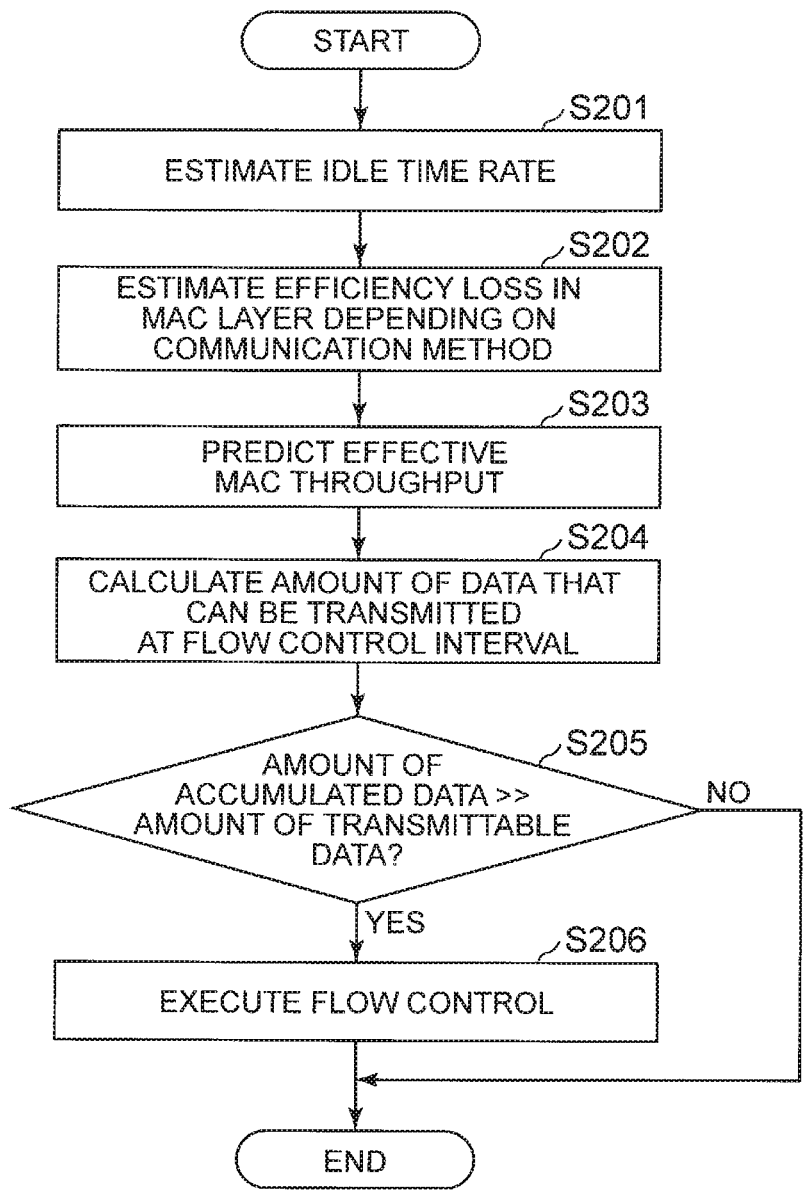
FIG. 7 It depicts a flowchart illustrating an operation example of the communication control apparatus of the second exemplary embodiment.

Next, an operation of the communication control apparatus 70 of the present exemplary embodiment will be described. FIG. 7 is a flowchart illustrating an example of the operation of the communication control apparatus 70 of the present exemplary embodiment, specifically, an operation related to a method of predicting a throughput expectation value and flow control based on an available band in a MAC layer in a flow control unit 73.

In the example illustrated in FIG. 7, first, by using statistical information of a radio wave index input from the index management unit 731, the throughput expectation value predicting unit 732 of the communication control apparatus 70 estimates an idle time rate in which no other wireless device performs wireless transmission (Step S201). Since the present step is similar to the operation described in Step S101 of the first exemplary embodiment, a description thereof is omitted.

Next, by using a measured communication index and the like, the throughput expectation value predicting unit 732 estimates an efficiency loss that may be generated in a MAC layer of the relay apparatus 20 (Step S202).

In a case of a wireless LAN using CSMA/CA as a multi-access method, transmission waiting time (such as DCF inter frame space (DIFS) or short inter frame space (SIFS)) is generated in each frame in order to autonomously avoid collision of frames. Also, in the wireless LAN, since retransmission in a MAC layer is performed by using random back-off, an efficiency loss is generated. Thus, in order to prevent overflow of a transmission buffer in the MAC layer, it is necessary to consider not only a physical throughput in the MAC layer but also an efficiency loss due to transmission waiting time or retransmission in the MAC layer.

Here, estimation is performed with an efficiency loss of waiting time that is always generated fixedly being $\alpha$, and an efficiency loss due to retransmission in the MAC layer which loss depends on a retransmission probability depending on the number of connected devices and the like being $\beta$. Since the lengths of DIFS and SIFS are determined by each standard of the wireless LAN (such as IEEE802.11a, 11g, or 11n), a different value is set as $\alpha$ for each standard in consideration of a ratio of waiting time of DIFS and SIFS to a set MAC frame length. For example, with respect to $\beta$, a frame error rate in the MAC layer is included in a measured communication index and an efficiency loss is determined with reference to this value.

Since the probability of retransmission also depends on the number of connected devices, a relationship between the number of connected devices and the frame error rate is acquired by an experiment, simulation, or the like when environment allows measurement of the number of connected devices, and calculation may be performed by utilization of the relationship. Also, $\alpha$ and $\beta$ may be updated by an adaptive algorithm such as a least mean square (LMS), a normalized LMS (NLMS), or a recursive least square (RLS) by utilization of a MAC throughput that can be measured after frame transmission.

Next, the throughput expectation value predicting unit 732 predicts an effective MAC throughput including an efficiency loss in the MAC layer by using a predetermined estimation equation (Step S203). The throughput expectation value predicting unit 732 performs calculation, for example, by the following prediction equation (3). In the following, there is a case where the effective MAC throughput that includes the efficiency loss in the MAC layer and that is acquired by the prediction is referred to as an expectation value of effective throughput in the MAC layer.

$$\text{Effective MAC throughput} = f_{TPMAX}(q) \times R(1-\alpha) \times (1-\beta) \quad (3)$$

Here, $f_{TPMAX}(q)$ is a function to calculate a maximum physical throughput with radio quality q as a variable. R is an idle time rate.

Note that $f_{TPMAX}(\ )$ may be determined by calculation of a relationship between the radio quality q and the maximum physical throughput by previous experiment in the same environment, or may be theoretically calculated by utilization of communication channel capacity C or the like derived from the Shannon-Hartley theorem indicated by the following equation (4). Note that B is a transmission band in the equation (4).

$$C = B * \log 2(1+q) \quad (4)$$

Next, the throughput expectation value predicting unit 732 calculates an amount of data that can be transmitted at a flow control interval (Step S204). For example, when the flow control is performed every 100 ms, in a case where the effective MAC throughput calculated above (expectation value of effective throughput) is 15 Mbps, an amount of transmittable data is 15 Mbps×0.1 s/8 bits=187.5 KB.

Then, the throughput expectation value predicting unit 732 compares an amount of data temporarily accumulated in the buffer unit with an amount of transmittable data (Step S205). When the amount of temporarily accumulated data is smaller than the amount of transmittable data, there is no need to control transmission of data by flow control. Thus, the flow control is skipped and the processing is ended (Step S205 No). On the other hand, when the amount of temporarily accumulated data is larger than the amount of transmittable data, it is necessary to control transmission of data by flow control. Thus, the processing advances to the flow control in Step S206 (Step S205 Yes).

In Step S206, the buffer control unit 733 performs the flow control by using the expectation value of the effective MAC throughput predicted in Step S203. Since a method of the flow control is the same as that described in the first exemplary embodiment, a description thereof is omitted.

In the present exemplary embodiment, performance is possible without any change in the relay apparatus 20. Thus, it is possible to expect an improvement of a communication characteristic only by adding the communication control apparatus 70 to an existing relay apparatus. Note that in the present exemplary embodiment, the wireless unit 24 of the relay apparatus 20 corresponds to a MAC layer, and the flow control unit 73 of the communication control apparatus 70 corresponds to an upper layer.

Also, in the present exemplary embodiment, a configuration in which a throughput estimation function and a flow control function are performed in the communication control apparatus 70 directly connected to the relay apparatus 20 including the MAC layer that performs wireless communication to be controlled has been described. However, the functions of communication control apparatus 70 may be anywhere in the network.

Other Exemplary Embodiments

Also, a wireless LAN is assumed as a wireless communication method in each of the above exemplary embodiments. However, a wireless communication method is not limited to the wireless LAN. For example, implementation is also possible with respect to other wireless access methods (such as Bluetooth (registered trademark), ZigGee, WiGig, low power wide area network (LoRaWAN), Sigfox, and Wi-Fi HaLow).

Also, in each of the above exemplary embodiments, a case where one frequency channel of the wireless LAN is used has been described. However, the present invention can be also used in a case where a plurality of frequency channels is used. The plurality of frequency channels is not limited to the same frequency band, and may include a 920 MHz band, a 2.4 GHz band, a 5 GHz band, a 60 GHz band, and the like. Here, a frequency channel may be selected in such a manner that one frequency channel transmits one data flow, or two or more frequency channels may be used simultaneously. In a case where two or more frequency channels are used simultaneously, the above-described estimation of an amount of transmitted data and data flow control are performed for each frequency channel and an amount of transmitted data is controlled.

Figure 8:
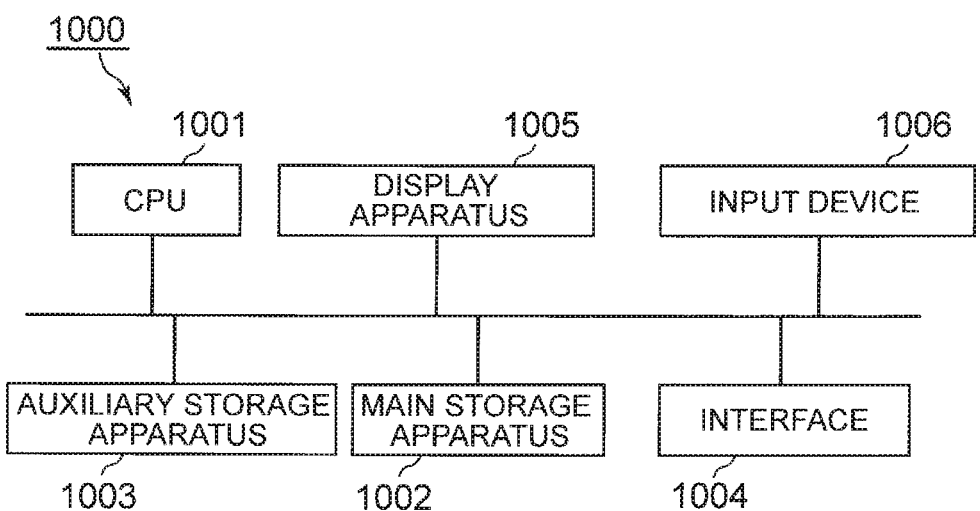
FIG. 8 It depicts a schematic block diagram illustrating a configuration example of a computer according to an exemplary embodiment of the present invention.

Next, a configuration example of a computer according to an exemplary embodiment of the present invention will be described. FIG. 8 depicts a schematic block diagram illustrating a configuration example of a computer according to an exemplary embodiment of the present invention. A computer 1000 includes a CPU 1001, a main storage apparatus 1002, an auxiliary storage apparatus 1003, an interface 1004, a display apparatus 1005, and an input device 1006.

Nodes (specifically, relay apparatus 20 and communication control apparatus 70) of wireless communication systems of the above-described exemplary embodiments may be implemented in the computer 1000 having a radio function. In that case, an operation of each node may be stored in the auxiliary storage apparatus 1003 in a form of a program. The CPU 1001 reads the program from the auxiliary storage apparatus 1003, expands the program in the main storage apparatus 1002, and performs predetermined processing in each exemplary embodiment according to the program. Note that the CPU 1001 is an example of an information processing apparatus that operates according to the program. In addition to the central processing unit (CPU), a micro processing unit (MPU), a memory control unit (MCU), a graphics processing unit (GPU), or the like may be included, for example.

The auxiliary storage apparatus 1003 is an example of a non-transitory tangible medium. Other examples of a non-transitory tangible medium include a magnetic disk, a magneto-optical disk, a CD-ROM, a DVD-ROM, a semiconductor memory, and the like connected through the interface 1004. Also, in a case where this program is distributed to the computer 1000 through a communication line, the computer 1000 that receives the distribution may expand the program in the main storage apparatus 1002 and execute predetermined processing in each exemplary embodiment.

Also, the program may be for realizing a part of predetermined processing in the above exemplary embodiments. Moreover, the program may be a difference program that realizes predetermined processing in the above exemplary embodiments in combination with a different program already stored in the auxiliary storage apparatus 1003.

The interface 1004 transmits/receives information to/from a different apparatus. Also, the display apparatus 1005 presents information to a user. Also, the input device 1006 receives an input of information from the user.

Also, depending on processing contents in an exemplary embodiment, a part of elements of the computer 1000 can be omitted. For example, when a node does not present information to a user, the display apparatus 1005 can be omitted. For example, when a node does not receive an information input from a user, the input device 1006 can be omitted.

Also, a part or whole of each component of each apparatus is performed by general-purpose or dedicated circuitry, processor, and the like or a combination thereof. These may include a single chip or may include a plurality of chips connected through a bus. Also, a part or whole of each component of each apparatus may be realized by a combination of the above-described circuitry and the like, and the program.

In a case where a part or whole of each component of each apparatus is realized by a plurality of information processing apparatuses, circuitry, and the like, the plurality of information processing apparatuses, circuitry, and the like may be collectively arranged or dispersedly arranged. For example, the information processing apparatuses, circuitry, and the like may be realized in a form of being connected through a communication network, the form being a client and server system or a cloud computing system, for example.

Figure 9:
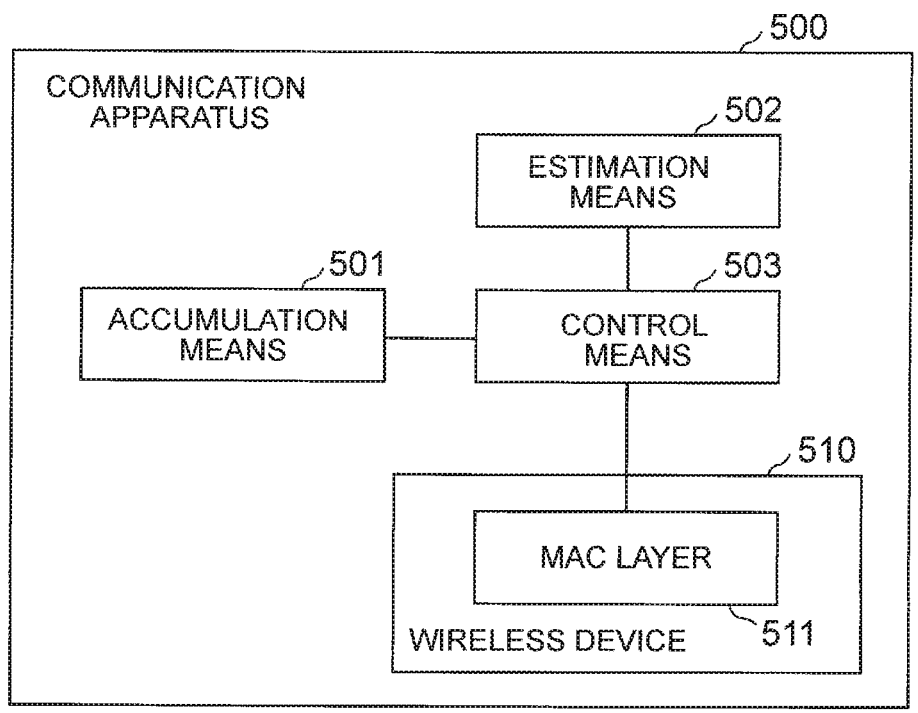
FIG. 9 It depicts a block diagram illustrating an outline of a communication apparatus of the present invention.

Next, an outline of the present invention will be described. FIG. 9 is a block diagram illustrating an outline of a communication apparatus of the present invention. A communication apparatus 500 illustrated in FIG. 9 is a communication apparatus used in a wireless communication system in which a plurality of wireless devices shares a frequency used for communication, and is a communication apparatus that performs wireless communication with a different wireless device through a MAC layer 511 by operating as an upper layer of the MAC layer 511 (layer higher than MAC layer and not limited to immediately above layer) included in any of the wireless devices (wireless device 510 in present example). Note that the wireless device 510 may be implemented as an apparatus different from the communication apparatus 500.

The communication apparatus 500 of the present invention includes an accumulation means 501, an estimation means 502, and a control means 503.

The accumulation means 501 (such as buffer unit 21 or 71) temporarily accumulates communication data in a previous stage of transmission to the MAC layer. Here, the communication data in the previous stage of transmission to the MAC layer only needs to be wireless communication data (data that is for wireless communication and that include user data) in an arbitrary layer before transmission to the MAC layer, and may be wireless communication data in a predetermined upper layer of the MAC layer.

The estimation means 502 (such as throughput expectation value predicting unit 232 or 732) estimates an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by the own apparatus or a wireless device 510 including a MAC layer 511 used by the own apparatus.

The control means 503 (such as buffer control unit 233 or 733) controls a data flow in transmission of communication data accumulated in the accumulation means 501 to a lower layer on the basis of an estimation result of an amount of transmittable data.

With such a configuration, in a wireless communication system using an unlicensed band, a communication characteristic can be improved even in a case where a rapid environmental change such as a rapid deterioration in radio quality or a rapid increase in the number of connected devices occurs.

Note that the above-described exemplary embodiments can be also described in a manner of the following supplementary notes.

(Supplementary note 1) A communication apparatus that is used in a wireless communication system in which a plurality of wireless devices shares a frequency used for communication and that performs, by operating as an upper layer of a MAC layer included in any of the wireless devices, wireless communication with a different wireless device through the MAC layer, the communication apparatus including: an accumulation means that temporarily accumulates communication data in a previous stage of transmission to the MAC layer; an estimation means that estimates an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by an own apparatus or a wireless device including the MAC layer used by the own apparatus; and a control means that controls, on the basis of an estimation result of the amount of transmittable data, a data flow of when the communication data is transmitted to a lower layer.

(Supplementary note 2) The communication apparatus according to supplementary note 1, wherein the control means determines whether to perform control of the data flow by comparing an amount of data accumulated in the accumulation means with the amount of transmittable data.

(Supplementary note 3) The communication apparatus according to supplementary note 1 or supplementary note 2, wherein the estimation means estimates, as the amount of transmittable data, the amount of data that can be transmitted in the MAC layer at a control interval of the data flow, and the control means controls the data flow in a case where the amount of data accumulated in the accumulation means exceeds the amount of transmittable data.

(Supplementary note 4) The communication apparatus according to any one of supplementary note 1 to supplementary note 3, wherein the estimation means estimates an idle time rate of the frequency by using a statistical value of the radio wave index, and estimates the amount of transmittable data by using the acquired idle time rate, the radio wave index, and the communication index.

(Supplementary note 5) The communication apparatus according to supplementary note 4, wherein the estimation means estimates the amount of transmittable data on the basis of an expectation value of a physical throughput of a wireless link which value is estimated by utilization of the idle time rate and the radio wave index.

(Supplementary note 6) The communication apparatus according to supplementary note 5, wherein the estimation means predicts an expectation value of an effective throughput including an efficiency loss in the MAC layer by using statistical information indicating a relationship between an effective throughput in the MAC layer, which throughput is measured as one communication index, and the expectation value of the physical throughput, and estimates the amount of transmittable data on the basis of the acquired expectation value of the effective throughput.

(Supplementary note 7) The communication apparatus according to supplementary note 5, wherein the estimation means performs correction of an expectation value of the effective throughput from the expectation value of the physical throughput by using a model equation of an efficiency loss in the MAC layer with the expectation value of the physical throughput of a radio link which value is one communication index calculated from the radio wave index being an input, and estimates the amount of transmittable data on the basis of the corrected expectation value of the effective throughput in the MAC layer.

(Supplementary note 8) The communication apparatus according to any one of supplementary note 1 to supplementary note 7, wherein the MAC layer uses two or more frequency channels including a plurality of frequency bands, and at least the estimation means and the control means perform estimation of an amount of transmittable data and control of a data flow for each frequency channel.

(Supplementary note 9) A wireless communication system including: a plurality of wireless devices that shares a frequency used for wireless communication; and a communication control apparatus that performs, by operating as an upper layer of a MAC layer included in any of the wireless devices, wireless communication with a different wireless device through the MAC layer, wherein the communication control apparatus includes an accumulation means that temporarily accumulates communication data in a previous stage of transmission to the MAC layer, an estimation means that estimates an amount of transmittable data, which is an amount of data that can be transmitted in the MAC layer in a predetermined period, by using a radio wave index that is an index related to a radio wave in the frequency and a communication index that is an index related to wireless communication using the frequency, the indices being measured by an own apparatus or a wireless device including a MAC layer used by the own apparatus, and a control means that controls, on the basis of an estimation result of the amount of transmittable data, a data flow of when the communication data is transmitted to a lower layer.

(Supplementary note 10) A data flow control method performed by a communication apparatus that is used in a wireless communication system in which a plurality of wireless devices shares a frequency used for communication and that performs, by operating as an upper layer of a MAC layer included in any of the wireless devices, wireless communication with a different wireless device through the MAC layer, the method including: temporarily accumulating communication data in a previous stage of transmission to the MAC layer; estimating an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by an own apparatus or a wireless device including a MAC layer used by the own apparatus; and controlling, on the basis of an estimation result of the amount of transmittable data, a data flow of when the communication data is transmitted to a lower layer.

Although the present invention has been described with reference to the present exemplary embodiment and an example, the present invention is not limited to the above exemplary embodiment and example. Various modifications that can be understood by those skilled in the art can be made within the scope of the present invention with respect to a configuration or a detail of the present invention.

This application claims priority based on Japanese Patent Application No. 2017-174911 filed on Sep. 12, 2017, the entire disclosure of which is incorporated herein.

INDUSTRIAL APPLICABILITY

The present invention can be suitably applied to a wireless communication system including a node that performs wireless communication.

REFERENCE SIGNS LIST 10, 20 Relay apparatus
30 IoT device
40 Internet
50 Server apparatus
60 Wireless device
70 Communication control apparatus
21, 71 Buffer unit
22, 24 Wireless unit
221, 721 Index measurement unit
23, 73 Flow control unit
231, 731 Index management unit
232, 732 Throughput expectation value predicting unit
233, 733 Buffer control unit
1000 Computer
1001 CPU
1002 Main storage apparatus
1003 Auxiliary storage apparatus
1004 Interface
1005 Display apparatus
1006 Input device
500 Communication apparatus
501 Accumulation means
502 Estimation means
503 Control means
510 Wireless device
511 MAC layer

What is claimed is:

1. A communication apparatus that is used in a wireless communication system in which a plurality of wireless devices shares a frequency used for communication and that performs, by operating as an upper layer of a MAC layer included in any of the wireless devices, wireless communication with a different wireless device through the MAC layer, the communication apparatus comprising:
at least one processor configured to:
accumulate, temporarily, communication data in a previous stage of transmission to the MAC layer;
estimate an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by an own apparatus; and
control, on the basis of an estimation result of the amount of transmittable data, a data flow of when the communication data is transmitted to a lower layer,
wherein the at least one processor estimates an idle time rate of the frequency by using a statistical value of the radio wave index, and estimates the amount of transmittable data by using the acquired idle time rate, the radio wave index, and the communication index, and
wherein the at least one processor estimates the amount of transmittable data on the basis of an expectation value of a physical throughput of a wireless link which value is estimated by utilization of the idle time rate and the radio wave index.

2. The communication apparatus according to claim 1, wherein
the at least one processor determines whether to perform control of the data flow by comparing an amount of data accumulated in the at least one processor with the amount of transmittable data.

3. The communication apparatus according to claim 1, wherein
the at least one processor estimates, as the amount of transmittable data, the amount of data that can be transmitted in the MAC layer at a control interval of the data flow, and
the at least one processor controls the data flow in a case where the amount of data accumulated in the at least one processor exceeds the amount of transmittable data.

4. The communication apparatus according to claim 1, wherein
the at least one processor predicts an expectation value of an effective throughput including an efficiency loss in the MAC layer by using statistical information indicating a relationship between an effective throughput in the MAC layer, which throughput is measured as one communication index, and the expectation value of the physical throughput, and estimates the amount of transmittable data on the basis of the acquired expectation value of the effective throughput.

5. The communication apparatus according to claim 1, wherein
the at least one processor performs correction of an expectation value of the effective throughput from the expectation value of the physical throughput by using a model equation of an efficiency loss in the MAC layer with the expectation value of the physical throughput of a radio link which value is one communication index calculated from the radio wave index being an input, and estimates the amount of transmittable data on the basis of the corrected expectation value of the effective throughput in the MAC layer.

6. The communication apparatus according to claim 1, wherein
the MAC layer uses two or more frequency channels including a plurality of frequency bands, and
the at least one processor performs estimation of the amount of transmittable data and control of the data flow for each frequency channel.

7. A data flow control method performed by a communication apparatus that is used in a wireless communication system in which a plurality of wireless devices shares a frequency used for communication and that performs, by operating as an upper layer of a MAC layer included in any of the wireless devices, wireless communication with a different wireless device through the MAC layer, the method comprising:
temporarily accumulating communication data in a previous stage of transmission to the MAC layer;
estimating an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by an own apparatus; and
controlling, on the basis of an estimation result of the amount of transmittable data, a data flow of when the communication data is transmitted to a lower layer,
wherein when estimating an amount of transmittable data, the communication apparatus estimates an idle time rate of the frequency by using a statistical value of the radio wave index, and estimates the amount of transmittable data by using the acquired idle time rate, the radio wave index, and the communication index, and wherein when estimating an amount of transmittable data, the communication apparatus estimates the amount of transmittable data on the basis of an expectation value of a physical throughput of a wireless link which value is estimated by utilization of the idle time rate and the radio wave index.

8. A non-transitory computer-readable recording medium in which communication program is recorded, the communication program is installed in a computer that is used in a wireless communication system in which a plurality of wireless devices shares a frequency used for communication and that performs, by operating as an upper layer of a MAC layer included in any of the wireless devices, wireless communication with a different wireless device through the MAC layer, the communication program causing the computer to perform:

an accumulation processing of accumulating, temporarily, communication data in a previous stage of transmission to the MAC layer in an accumulation unit;

an estimation processing of estimating an amount of transmittable data, which is an amount of data that can be transmitted in the MAC layer in a predetermined period, by using a radio wave index that is an index related to a radio wave in the frequency and/or a communication index that is an index related to wireless communication using the frequency, the indices being measured by an own apparatus; and a control processing of controlling, on the basis of an estimation result of the amount of transmittable data, a data flow of when the communication data is transmitted to a lower layer, wherein the communication program causes the computer to perform, in the estimation processing, estimating an idle time rate of the frequency by using a statistical value of the radio wave index, and estimating the amount of transmittable data by using the acquired idle time rate, the radio wave index, and the communication index, and wherein the communication program causes the computer to perform, in the estimation processing, estimating the amount of transmittable data on the basis of an expectation value of a physical throughput of a wireless link which value is estimated by utilization of the idle time rate and the radio wave index.

\* \* \* \* \*